（12）United States Patent
Wei et al.

(10) Patent No.: US 12,330,949 B1
(45) Date of Patent: Jun. 17, 2025

(54) SUPERCRITICAL FLUID-DRYING APPARATUS AND METHOD FOR DRYING GEL

(71) Applicant: GUANGDONG ALISON TECHNOLOGY CO., LTD., Guangdong (CN)

(72) Inventors: Ronghui Wei, Yingde (CN); Qiuhua Zhang, Yingde (CN); Wenjin Zhao, Yingde (CN); Liangbo Rao, Yingde (CN); Jinke Li, Yingde (CN)

(73) Assignee: GUANGDONG ALISON TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/941,911

(22) Filed: Nov. 8, 2024

(30) Foreign Application Priority Data

Nov. 30, 2023 (CN) .......................... 202311630324.9

(51) Int. Cl.
*C01B 33/158* (2006.01)
*F26B 5/00* (2006.01)

(52) U.S. Cl.
CPC .......... *C01B 33/1585* (2013.01); *F26B 5/005* (2013.01)

(58) Field of Classification Search
CPC ...... F26B 5/005; F26B 25/006; F26B 11/028; F26B 23/002; C01B 33/1585
See application file for complete search history.

(56) References Cited

U.S. PATENT DOCUMENTS

| | | |
|---|---|---|
| 2013/0212901 A1 | 8/2013 | Shan et al. |
| 2016/0114304 A1 | 4/2016 | Li |
| 2018/0243680 A1* | 8/2018 | Naito ..................... B01D 53/96 |

FOREIGN PATENT DOCUMENTS

| | | |
|---|---|---|
| CN | 104792066 A | 7/2015 |
| CN | 204665748 U | 9/2015 |
| CN | 106915235 A | 7/2017 |
| CN | 112031884 A | 12/2020 |
| CN | 217275455 U | 8/2022 |

(Continued)

OTHER PUBLICATIONS

Li, et al., "Study on Preparation Of Hydrophilic Sio2 Aerogel by Co2 Supercritical Drying", Architecture Technology, vol. 51, No. 12, Dec. 2020, pp. 1467-1471—Abstract.

(Continued)

*Primary Examiner* — Jessica Yuen
(74) *Attorney, Agent, or Firm* — HSML P.C.

(57) ABSTRACT

The present disclosure provides a supercritical fluid-drying apparatus and a method for drying gel. The apparatus includes a circulation fluid storage tank, a circulation compressor with a feed inlet in communication with the circulation fluid storage tank, a drying unit with a fluid inlet in communication with a discharge outlet of the circulation compressor, a separation unit with a fluid inlet in communication with a fluid outlet of the drying unit, an expander disposed between the drying unit and the separation unit, and a heating-medium storage tank in communication with a first heat exchanger inlet of the circulation compressor and a heating-medium outlet of the drying unit. A first heat exchanger outlet of the circulation compressor is in communication with a heating-medium inlet of the drying unit.

14 Claims, 1 Drawing Sheet

(56) References Cited

FOREIGN PATENT DOCUMENTS

| | | |
|---|---|---|
| CN | 116393052 A | 7/2023 |
| DE | 196 08 974 C1 | 3/1997 |
| JP | 2004-135752 A | 5/2004 |
| JP | 2007-303756 A | 11/2007 |

OTHER PUBLICATIONS

Notification to Grant Patent Right for Invention issued in corresponding Chinese Patent Application No. 202311630324.9, Mar. 7, 2024, 5 pages.

* cited by examiner

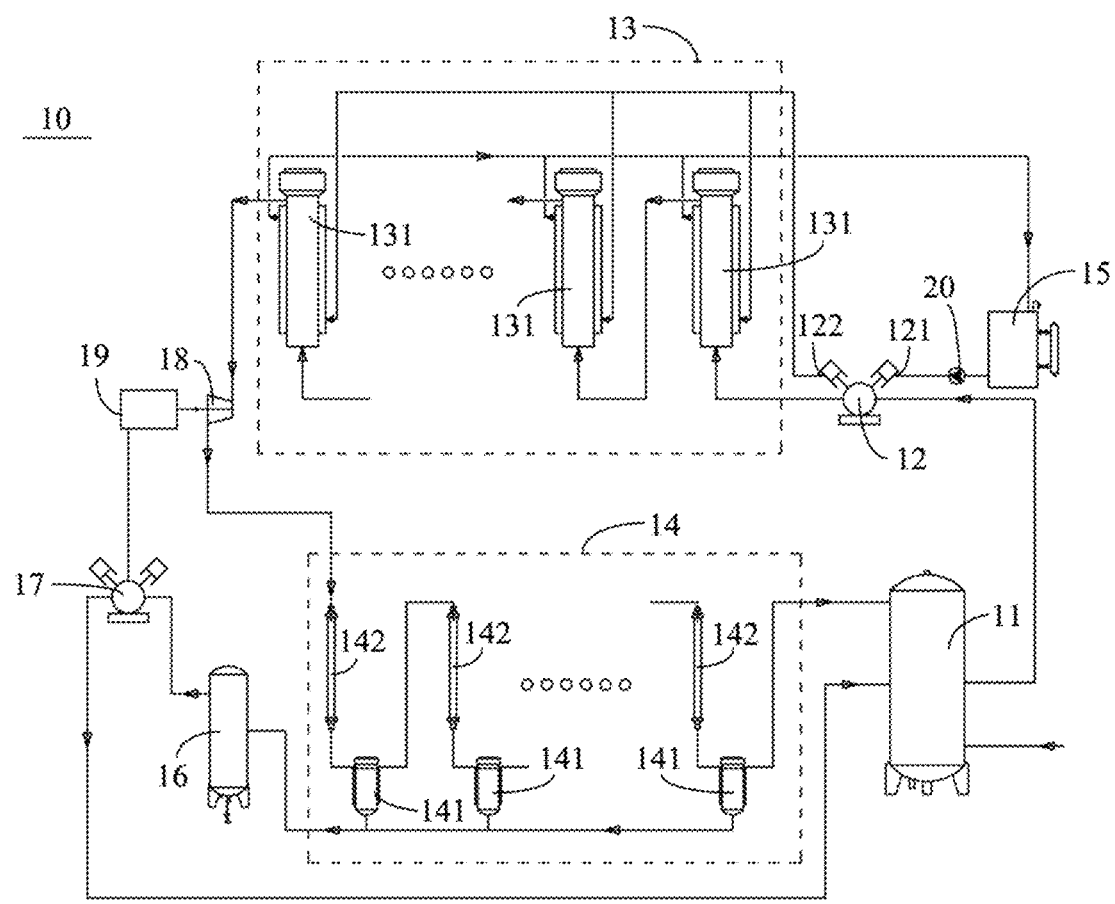

SUPERCRITICAL FLUID-DRYING APPARATUS AND METHOD FOR DRYING GEL

CROSS-REFERENCE TO RELATED APPLICATION

This application claims priority under 35 U.S.C. 119 from Chinese patent application No. 202311630324.9 filed on Nov. 30, 2023, the content of which is hereby incorporated by reference in its entirety.

TECHNICAL FIELD

The present disclosure relates to the technical field of aerogel preparation, in particular to a supercritical fluid-drying apparatus and a method for drying gel.

BACKGROUND

Supercritical fluid-drying technology is a relatively early and mature drying method among aerogel drying techniques. The supercritical fluid-drying process generally involves placing a gel and a certain amount of a solvent into a drying container, increasing the temperature and the pressure of the solvent above their supercritical points, maintaining the temperature for a period of time until the solvent is fully diffused into the gel and then slowly released from the gel, and then cooling to obtain an aerogel.

However, conventional supercritical fluid-drying apparatuses require a large amount of energy to increase the temperature and the pressure, and have a low energy conversion and utilization efficiency and a significant energy dissipation in the drying process, resulting in a high energy consumption and a low drying efficiency of the conventional supercritical fluid-drying apparatuses.

Therefore, reducing the energy consumption and improving the energy utilization efficiency of the supercritical fluid-drying apparatuses has become a current research hotspot in the art.

SUMMARY

A first aspect of the present disclosure provides a supercritical fluid-drying apparatus, including a circulation fluid storage tank, a circulation compressor, a drying unit, a separation unit, an expander, and a heating-medium storage tank. A feed inlet of the circulation compressor is in communication with the circulation fluid storage tank. The circulation compressor is provided with a first heat exchanger thereon. A fluid inlet of the drying unit is in communication with the discharge outlet of the circulation compressor. The drying unit is configured to dry a material. A fluid inlet of the separation unit is in communication with a fluid outlet of the drying unit. The separation unit is configured to separate a solvent from a fluid. The expander is disposed on a pipeline communicating the fluid outlet of the drying unit and the fluid inlet of the separation unit. A first heat exchanger inlet of the circulation compressor is in communication with the heating-medium storage tank. A first heat exchanger outlet is in communication with a heating-medium inlet of the drying unit. A heating-medium outlet of the drying unit is in communication with the heating-medium storage tank.

In some embodiments, the supercritical fluid-drying apparatus further includes a recovery fluid storage tank and a recovery compressor. A feed inlet of the recovery fluid storage tank is in communication with a solvent outlet of the separation unit. A feed inlet of the recovery compressor is in communication with a recovery fluid outlet of the recovery fluid storage tank. A discharge out of the recovery compressor is in communication with the circulation fluid storage tank.

In some embodiments, the supercritical fluid-drying apparatus further includes an electric generator. The expander is connected to the electric generator and configured to drive the electric generator to generate electricity.

In some embodiments, the electric generator is connected to the recovery compressor and/or other electrical devices and configured to supply power to the recovery compressor and/or the other electrical devices.

In some embodiments, the drying unit includes a plurality of drying tanks connected in series. In a flow direction of the fluid, a fluid outlet of a preceding one of the drying tanks is in communication with a fluid inlet of an immediately subsequent one of the drying tanks.

In some embodiments, a heating-medium inlet of each of the drying tanks is in communication with the first heat exchanger outlet of the circulation compressor. A heating-medium outlet of each of the drying tanks is in communication with the heating-medium storage tank. A heating-medium circulation pump is disposed on a pipeline communicating the first heat exchanger inlet of the circulation compressor and the heating-medium storage tank.

In some embodiments, the separation unit includes a plurality of separation tanks connected in series. In a flow direction of the fluid, a fluid outlet of a preceding one of the separation tanks is in communication with a fluid inlet of an immediately subsequent one of the separation tanks.

In some embodiments, the separation unit further comprises a plurality of second heat exchangers. Each of the separation tanks is provided with at least one second heat exchanger at a front end of the fluid inlet thereof.

In some embodiments, the circulation fluid storage tank is configured to store the fluid and the fluid includes carbon dioxide gas.

A second aspect of the present disclosure provides a method for drying gel by the supercritical fluid-drying apparatus as described in the first aspect of the present disclosure. The method includes: placing a wet gel containing a solvent into the drying unit; introducing a pressurized fluid into the drying unit through the circulation compressor and heating the drying unit with the heating medium, such that the fluid in the drying unit reaches a supercritical state to dry the wet gel; and introducing the fluid from the drying unit into the separation unit to separate the solvent from the fluid, wherein the fluid is depressurized by the expander to recover energy therefrom during introducing the fluid from the drying unit into the separation unit.

BRIEF DESCRIPTION OF THE DRAWINGS

In order to better describe and illustrate the embodiments or examples of the present disclosure, one or more accompanying drawings may be referred to. The additional details or examples used to describe the accompanying drawings should not be considered as limiting the scope of the present disclosure. Moreover, the same or similar reference signs throughout the accompanying drawings represent same or similar components.

FIG. 1 is a schematic structure view of a supercritical fluid-drying apparatus according to an embodiment of the present disclosure.

REFERENCE SIGNS 10, supercritical fluid-drying apparatus; 11, circulation fluid storage tank; 12, circulation compressor; 13, drying unit; 14, separation unit; 15, heating-medium storage tank; 16, recovery fluid storage tank; 17, recovery compressor; 18, expander; 19, electric generator; 20, heating-medium circulation pump; 121, first heat exchanger inlet; 122, first heat exchanger outlet; 131, drying tank; 141, separation tank; 142, second heat exchanger.

DETAILED DESCRIPTION

The embodiments of the present disclosure will be described in detail below, in order to make the above objects, features and advantages of the present disclosure more apparent and understandable. Numerous specific details are set forth in the following description in order to facilitate a thorough understanding of the present disclosure. However, the present disclosure can be implemented in many other ways than those describe herein, and similar modifications can be made by those skilled in the art without departing from the concept of the present disclosure, and thus the present disclosure is not limited to the embodiments disclosed below.

In addition, the terms "first" and "second" are used for descriptive purposes only, which cannot be construed as indicating or implying a relative importance, or implicitly specifying the number of the indicated technical features. Thus, the features defined with "first" and "second" may explicitly or implicitly include at least one feature. In the description of the present disclosure, "a plurality of" means at least two, such as two or three, unless otherwise defined explicitly and specifically.

In the present disclosure, unless otherwise specified and defined explicitly, the terms "install", "connect", "attach", and "fix" should be understood in a broad sense. For example, unless otherwise defined explicitly, they may refer to a fixed connection, a detachable connection, or an integral connection, may refer to a mechanical connection or electrical connection, and may refer to a direct connection, an indirect connection via an intermediate medium, an internal connection between two elements, or interaction between two elements. Those of ordinary skill in the art can understand specific meanings of these terms in the present disclosure according to specific situations.

Unless otherwise defined, all technical and scientific terms used herein have the same meaning as commonly understood by those skilled in the art to which the present disclosure pertains. The terms used in the specification of the present disclosure herein are for the purpose of describing specific embodiments only and are not intended to limit the present disclosure. As used herein, the terms "and/or" include any and all combinations of one or more relevant listed items.

Referring to FIG. 1, an embodiment of the present disclosure provides a supercritical fluid-drying apparatus 10. The supercritical fluid-drying apparatus 10 includes a circulation fluid storage tank 11, a circulation compressor 12, a drying unit 13, a separation unit 14, an expander 18, and a heating-medium storage tank 15. A feed inlet of the circulation compressor 12 is in communication with the circulation fluid storage tank 11 by a pipeline. The circulation compressor 12 has a first heat exchanger thereon. A fluid inlet of the drying unit 13 is in communication with a discharge outlet of the circulation compressor 12 by a pipeline. The drying unit 13 is configured to dry a material with a supercritical fluid. A fluid inlet of the separation unit 14 is in communication with a fluid outlet of the drying unit 13 by a pipeline. A fluid outlet of the separation unit 14 is in communication with circulation fluid storage tank 11 by a pipeline. The separation unit 14 is configured to separate a solvent from a fluid from the drying unit 13. The expander 18 is disposed on a pipeline that communicates the fluid outlet of the drying unit 13 with the fluid inlet of the separation unit 14, and is configured to depressurize the fluid to separate the fluid and the solvent more adequately and to recover the energy from the fluid more fully. A first heat exchanger inlet 121 of the circulation compressor 12 is in communication with the heating-medium storage tank 15 by a pipeline. A first heat exchanger outlet 121 of the circulation compressor 12 is in communication with a heating-medium inlet of the drying unit 13 by a pipeline. A heating-medium outlet of the drying unit 13 is in communication with the heating-medium storage tank 15 by a pipeline.

In the operation of the above-described supercritical fluid-drying apparatus 10, a material to be dried (such as a wet gel containing a solvent) is placed into the drying unit 13 first. A pressurized fluid is introduced into the drying unit 13 through the circulation compressor 12, and the drying unit 13 is heated by a heating medium flowing from the heating-medium storage tank 15 through the first heat exchanger and then into a heating jacket of the drying unit 13, allowing the fluid in the drying unit 13 to reach a supercritical state to dry the material to be dried. After drying is completed, the fluid is introduced from the drying unit 13 into the separation unit 14 to separate the solvent from the fluid, and the separated fluid can flow into the circulation fluid storage tank 11 for recycling. In the process of introducing the fluid from the drying unit 13 into the separation unit 14, the fluid is depressurized by the expander 18 to recover the energy from the fluid.

The conventional supercritical fluid-drying apparatus typically uses a high-pressure pump to pressurize the fluid (such as liquid carbon dioxide) from the circulation fluid storage tank 11 before passing the fluid into the drying unit 13 to dry the material to be dried (such as a wet gel). The gaseous fluid needs to be converted into a liquid fluid before entering the high-pressure pump, necessitating incorporation of devices such as a condenser and a supercooling equipment into the apparatus, as well as incorporation of auxiliary systems such as a refrigerator and a coolant circulation system. Moreover, an additional heating system needs to be incorporated into the apparatus to continuously provide heat to maintain the temperature of the pressurized fluid entering the drying unit 13 throughout the operation process. Therefore, the conventional supercritical fluid-drying apparatus has a complicated structure and consumes a significant amount of energy during the heating and pressurizing of the fluid, resulting in a high energy consumption.

In the above-described supercritical fluid-drying apparatus 10 according to the present disclosure, the gaseous fluid is pressurized by the circulation compressor 12 that has the first heat exchanger inlet 121 in communication with the heating-medium storage tank 15 and the first heat exchanger outlet 122 in communication with the heating-medium inlet of the drying unit 13, during which the fluid can be directly heated to a desired temperature and the excess heat generated by the circulation compressor 12 during operation can be absorbed and utilized by the heating medium. As a result, the supercritical fluid-drying apparatus 10 can maintain a heat balance during operation without requiring additional heat except for the supplementary heat provided by the heating medium during startup. In contrast, the conventional supercritical fluid-drying apparatus that uses a high-pressure pump requires an additional heating system to continuously maintain the temperature of the pressurized fluid. Compared to the conventional supercritical fluid-drying apparatus with the high-pressure pump, the supercritical fluid-drying apparatus 10 according to the present disclosure has a lower energy consumption and can use a gaseous fluid as a medium for supercritical drying.

In addition, the supercritical fluid-drying apparatus 10 according to the present disclosure uses the circulating compressor 12 to pressurize the gaseous fluid, and the fluid separated by the separation unit 14 can be directly pressurized and circulated without being condensed into a liquid during the circulation process, simplifying the structure of the supercritical fluid-drying apparatus 10. Moreover, the pressure of fluid in separation can be reduced to a relatively low level, allowing the fluid and the solvent to be separated more completely, and thereby improving the operation stability of the apparatus. By providing the expander 18 on the pipeline communicating the fluid outlet of the drying unit 13 and the fluid inlet of the separation unit 14, on the one hand, the pressure of the fluid after the drying operation can be sufficiently reduced, which is beneficial to complete separation of the fluid and the solvent in the subsequent separation operation; on the other hand, the energy can be recovered from the fluid and converted into kinetic energy, thereby further improving the energy recovery and utilization rate and further reducing the energy consumption of the apparatus. However, the conventional supercritical fluid-drying apparatus with a high-pressure pump does not have these functions.

It should be understood that the fluid stored in the circulation fluid storage tank 11 can be a fluid commonly used in the art. In a specific example, the fluid stored in the circulation fluid storage tank 11 is carbon dioxide gas. The first heat exchanger disposed on the circulation compressor 12 mainly serves to heat the fluid flowing through the circulation compressor 12 when the circulation compressor 12 is just started, and to absorb excess heat generated by the circulation compressor 12 during the operation of the circulation compressor 12, thereby achieving the full utilization of energy and avoiding the temperature of the circulation compressor 12 to be excessively high to affect the service life of the circulation compressor 12. The drying unit 13 has an inner cavity for containing the material to be dried and a heating jacket disposed around the periphery of the inner cavity for heating the inner cavity. The heating-medium inlet and the heating-medium outlet of the drying unit 13 are each in communication with the heating jacket. The expander 18 is a device that utilizes the expansion of a compressed gas to perform mechanical work, resulting in a decrease in the temperature and pressure of the gas, while converting the internal energy of the gas into kinetic energy.

In some embodiments, the supercritical fluid-drying apparatus 10 further includes a recovery fluid storage tank 16 and a recovery compressor 17. A feed inlet of the recovery fluid storage tank 16 is in communication with a solvent outlet of the separation unit 14 by a pipeline. A feed inlet of the recovery compressor 17 is in communication with a recovery fluid outlet of the recovery fluid storage tank 16 by a pipeline. A discharge outlet of the recovery compressor 17 is in communication with the circulation fluid storage tank 11 by a pipeline. After the solvent is separated from the fluid by the separation unit 14, the fluid flows into the circulation fluid storage tank 11 through the fluid outlet of the separation unit 14 for recycling, and the separated solvent enters the recovery fluid storage tank 16 through the solvent outlet of the separation unit 14. The fluid remaining in the separated solvent is further separated from the solvent and introduced into the circulation fluid storage tank 11 through the recovery compressor 17 for recycling. As such, the utilization rate of the fluid can be further improved.

In some embodiments, the supercritical fluid-drying apparatus 10 further includes an electric generator 19. The expander 18 is connected to the electric generator 19 and configured to drive the electric generator 19 to generate electricity. By connecting the expander 18 to the electric generator 19, the energy recovered from the fluid by the expander 18 can be used to drive the electric generator 19 to generate electricity to supply power to some electric devices of the supercritical fluid-drying apparatus 10, thereby further reducing the energy consumption of the supercritical fluid-drying apparatus 10.

In some specific examples, the output terminal of the electric generator 19 is electrically connected to the recovery compressor 17 to provide power to the recovery compressor 17. It should be understood that the output terminal of the electric generator 19 can also be connected to other electrical devices to provide power to other electrical devices. As a specific example, the other electrical devices can include the circulation compressor 12.

In some embodiments, the drying unit 13 includes a plurality of drying tanks 131 connected in series. In the flow direction of the fluid, the fluid outlet of the preceding drying tank 131 is in communication with the fluid inlet of the immediately subsequent drying tank 131. As such, the gel to be dried can be placed into each of the plurality of drying tanks 131, and the pressurized fluid can sequentially pass through the individual drying tanks 131 to dry the gel, greatly improving the efficiency of the supercritical fluid-drying apparatus 10. It should be understood that, in the flow direction of fluid, the preceding drying tank 131 refers to the drying tank 131 into which the fluid flows first, and the following drying tank 131 refers to the drying tank 131 into which the fluid flows subsequently.

Referring to FIG. 1, in some embodiments, each drying tank 131 has an inner cavity where the gel to be dried is placed. The fluid inlet is provided at the bottom of the drying tank 131, and the fluid outlet is provided at the upper part of the drying tank 131, allowing the fluid to flow in from the bottom and out from the upper part to dry the gel, thereby improving the drying effect. A heating jacket is disposed on the side wall of the drying tank 131. The heating jacket is provided with a heating-medium inlet on the lower end thereof and a heating-medium outlet on the upper end thereof. A heating medium is introduced into the heating jacket to heat the material in the drying tank 131 to maintain the gel and the fluid at a temperature required for drying. It should be understood that the flow of the heating medium in a bottom-in, top-out manner within the heating jacket can improve both heating effectiveness and efficiency. In a specific example, the heating medium is hot water.

Referring to FIG. 1, in some embodiments, the heating-medium inlet of each of the drying tanks 131 is in communication with the first heat exchanger outlet 122 of the circulation compressor 12 by a pipeline, and the heating-medium outlet of each of the drying tanks is in communication with the heating-medium storage tank 15 by a pipeline. In other words, the heating-medium inlets of the drying tanks 131 are connected in parallel to each other, and the heating medium outlets of the drying tanks 131 are connected in parallel to each other. The heating-medium storage tank 15 supplies the heating medium to the heating jacket of each of the drying tanks 131. As such, the temperature of each of the drying tanks 131 can be controlled effectively to maintain the temperature of each of the drying tanks 131 within a predetermined range.

In a specific example, the heating medium is hot water.

In some embodiments, a heating-medium circulation pump 20 is disposed on a pipeline communicating the first heat exchanger inlet 121 of the circulation compressor 12 and the heating-medium storage tank 15. The flow rate of the heating medium introduced into the heating jacket of the drying tank 131 can be conveniently controlled by the heating-medium circulation pump 20, allowing for convenient regulation of the temperature of each of the drying tanks 131.

Referring to FIG. 1, in some embodiments, the separation unit 14 includes a plurality of separation tanks 141 connected in series. In the flow direction of the fluid, the fluid outlet of the preceding separation tank 141 is in communication with the fluid inlet of the immediately subsequent separation tank 141 by a pipeline. The fluid obtained after the drying operation in the drying tank 131 contains a solvent incorporated into the fluid. The solvent is easy to be separated from the fluid by passing the fluid through the expander 18 to expand the fluid to decrease the temperature and pressure of the fluid before the separation. By providing a plurality of separation tanks 141 connected in series, the expanded fluid is sequentially introduced into the individual separation tanks 141 to separate the solvent from the fluid. In this way, the solvent can be well separated from the fluid to reduce the amount of the solvent in the fluid circulating into the circulation fluid storage tank 11, thereby improving the operation stability of the apparatus.

It should be understood that a solvent absorbent for separating the solvent from the fluid can be placed into the inner cavity of the separation tank 141 to facilitate the separation of the solvent from the fluid. The solvent absorbent can be a substance that readily adsorbs the solvent but is insoluble in the fluid. In some specific examples, the solvent adsorbent can employ a molecular sieve. In this way, when the fluid containing the solvent flows through the solvent absorbent in the separation tank 141, the solvent therein can be absorbed by the solvent absorbent before the fluid flows through the fluid outlet into the next separation tank 141 and finally into the circulation fluid storage tank 11 for recycling.

In some embodiments, the separation unit 14 further includes a plurality of second heat exchangers 142. Each of the separation tanks 141 is provided with at least one second heat exchanger 142 at a front end of the fluid inlet thereof. In this way, the fluid containing the solvent can be cooled by the second heat exchangers 142 provided at the front ends of the fluid inlets of the separation tanks 141, so that the solvent can be better separated from the fluid after the separation operation in the separation tank 141.

It should be noted that, an insulation layer can be provided on various devices or pipes connecting those devices of the supercritical fluid-drying apparatus 10 according to the present disclosure to reduce the heat loss and the energy consumption.

A process of preparing an aerogel by using the supercritical fluid-drying apparatus 10 according to an embodiment of the present disclosure is as follows:

A wet gel containing a solvent is placed into each of the drying tanks 131 of the drying unit 13. The carbon dioxide gas pressurized by the circulation compressor 12 is introduced into the drying tanks 131, and hot water is introduced from the heating-medium storage tank 15 into the heating jackets of the drying tanks 131 through the heating-medium circulation pump 20 to heat the inner cavities of the drying tanks 131 to a predetermined temperature. The carbon dioxide gas in a supercritical state sequentially flows through the individual drying tanks 131 to dry the wet gel to obtain an aerogel. Since the first heat exchanger inlet 121 of the circulation compressor 12 is in communication with the heating-medium storage tank 15, and the first heat exchanger outlet 122 of the circulation compressor 12 is in communication with the heating-medium inlet of the drying unit 13, the heating medium can supplement heat to the carbon dioxide gas when the circulation compressor 12 is started and absorb and utilize heat generated by the circulation compressor 12 when the circulation compressor 12 is operated. After drying, the carbon dioxide gas containing the solvent is introduced from the drying tanks 131 into the separation tanks 141 of the separation unit 14 where the solvent is separated from the carbon dioxide gas by condensation and solvent absorption. After the sequential separation in the separation tanks 141, the separated carbon dioxide gas flows into the circulation fluid storage tank 11 for recycling. The separated solvent is recovered into the recovery fluid storage tank 16 through the solvent outlets of the separation tanks 141, and the carbon dioxide gas remaining in the solvent is further separated in the recovery fluid storage tank 16, and introduced into the circulation fluid storage tank 11 through a recovery compressor 17 for recycling. During the flowing of the carbon dioxide gas from the drying tanks 131 into the separation tanks 141, the carbon dioxide gas is expanded by the expander 18 to decrease its temperature and pressure and to provide energy to the electric generator 19 to generate electricity. The electric generator 19 supplies power to the recovery compressor 17.

In the above-described supercritical fluid-drying apparatus, the circulation compressor, which has its first heat exchanger inlet in communication with the heating-medium storage tank and its first heat exchanger outlet in communication with the heating-medium inlet of the drying unit, is used to pressurize the fluid. This allows the fluid to be directly heated to the required temperature during the pressurizing, while the excess heat generated by the circulation compressor during operation can be absorbed and utilized by the heating medium. As a result, the circulation compressor can maintain a heat balance during operation, except for the supplementary heat required during startup. In contrast, the conventional supercritical fluid-drying apparatus that uses a high-pressure pump requires an additional heating system to maintain the temperature of the pressurized fluid. Thus, the above-described supercritical fluid-drying apparatus has a lower energy consumption.

In addition, in the above-described method for drying gel, the circulation compressor is used to pressurize the fluid, and the fluid separated by the separation unit can be directly pressurized and circulated without being condensed into a liquid during the circulation process, simplifying the structure of the apparatus. Moreover, the pressure of fluid in separation can be reduced to a relatively low level, allowing the fluid and the solvent to be separated more completely, and thereby improving the operation stability of the apparatus.

Furthermore, by providing the expander on the pipeline communicating the fluid outlet of the drying unit and the fluid inlet of the separation unit, the pressure of the fluid after the drying operation can be sufficiently reduced, which is beneficial to complete separation of the fluid and the solvent in the subsequent separation operation, and the energy can be effectively recycled.

The technical features of the above-mentioned embodiments can be combined arbitrarily. In order to make the description concise, not all possible combinations of the technical features are described in the embodiments. However, as long as there is no contradiction in the combination of these technical features, the combinations should be considered as in the scope of the present disclosure.

The above-described embodiments are only several implementations of the present disclosure, and the descriptions are relatively specific and detailed, but they should not be construed as limiting the scope of the present disclosure. It should be understood by those skilled in the art that various modifications and improvements can be made without departing from the concept of the present disclosure, and all fall within the protection scope of the present disclosure. Therefore, the patent protection of the present disclosure shall be defined by the appended claims, and the specification and drawings can be used to explain the contents of the claims.

What is claimed is:

1. A supercritical fluid-drying apparatus, comprising a circulation fluid storage tank, a circulation compressor, a drying unit, a separation unit, an expander, and a heating-medium storage tank, wherein
    a feed inlet of the circulation compressor is in communication with the circulation fluid storage tank, and the circulation compressor is provided with a first heat exchanger thereon;
    a fluid inlet of the drying unit is in communication with a discharge outlet of the circulation compressor, and the drying unit is configured to dry a material;
    a fluid inlet of the separation unit is in communication with a fluid outlet of the drying unit, and the separation unit is configured to separate a solvent from a fluid;
    the expander is disposed on a pipeline communicating the fluid outlet of the drying unit and the fluid inlet of the separation unit; and
    a first heat exchanger inlet of the circulation compressor is in communication with the heating-medium storage tank, a first heat exchanger outlet of the circulation compressor is in communication with a heating-medium inlet of the drying unit, and a heating-medium outlet of the drying unit is in communication with the heating-medium storage tank.

2. The supercritical fluid-drying apparatus according to claim 1, further comprising a recovery fluid storage tank and a recovery compressor, wherein
    a feed inlet of the recovery fluid storage tank is in communication with a solvent outlet of the separation unit; and
    a feed inlet of the recovery compressor is in communication with a recovery fluid outlet of the recovery fluid storage tank, and a discharge outlet of the recovery compressor is in communication with the circulation fluid storage tank.

3. The supercritical fluid-drying apparatus according to claim 2, further comprising an electric generator, wherein the expander is connected to the electric generator and configured to drive the electric generator to generate electricity.

4. The supercritical fluid-drying apparatus according to claim 3, wherein the electric generator is also connected to the recovery compressor and configured to supply power to the recovery compressor.

5. The supercritical fluid-drying apparatus according to claim 1, wherein the drying unit comprises a plurality of drying tanks connected in series, and in a flow direction of the fluid, a fluid outlet of a preceding one of the drying tanks is in communication with a fluid inlet of an immediately subsequent one of the drying tanks.

6. The supercritical fluid-drying apparatus according to claim 5, wherein each of the drying tanks is provided with the fluid inlet at a bottom thereof and with the fluid outlet at an upper part thereof.

7. The supercritical fluid-drying apparatus according to claim 5, wherein a heating-medium inlet of each of the drying tanks is in communication with the first heat exchanger outlet of the circulation compressor, and a heating-medium outlet of each of the drying tanks is in communication with the heating-medium storage tank.

8. The supercritical fluid-drying apparatus according to claim 5, wherein each of the drying tanks is provided with a heating jacket on a side wall thereof, the heating-medium inlet is disposed on a lower end of the heating jacket, and the heating-medium outlet is disposed on an upper end of the heating jacket.

9. The supercritical fluid-drying apparatus according to claim 1, wherein a heating-medium circulation pump is disposed on a pipeline communicating the first heat exchanger inlet of the circulation compressor and the heating-medium storage tank.

10. The supercritical fluid-drying apparatus according to claim 1, wherein the separation unit comprises a plurality of separation tanks connected in series, and in a flow direction of the fluid, a fluid outlet of a preceding one of the separation tanks is in communication with a fluid inlet of an immediately subsequent one of the separation tanks.

11. The supercritical fluid-drying apparatus according to claim 10, wherein the separation unit further comprises a plurality of second heat exchangers, and each of the separation tanks is provided with at least one second heat exchange at a front end of the fluid inlet thereof.

12. The supercritical fluid-drying apparatus according to any one of claim 1, wherein the circulation fluid storage tank is configured to store the fluid and the fluid comprises carbon dioxide gas.

13. A method for drying a gel using the supercritical fluid-drying apparatus according to claim 1, comprising:
    placing a wet gel containing a solvent in the drying unit;
    introducing a pressurized fluid into the drying unit through the circulation compressor and heating the drying unit by the heating medium, such that the fluid in the drying unit reaches a supercritical state to dry the wet gel; and
    introducing the fluid from the drying unit into the separation unit to separate the solvent from the fluid, wherein the fluid is depressurized to recover energy from the fluid by the expander during introducing the fluid from the drying unit into the separation unit.

14. A supercritical fluid-drying apparatus comprising:
    a circulation fluid storage tank,
    a circulation compressor with a feed inlet in communication with the circulation fluid storage tank, wherein the circulation compressor is provided with a first heat exchanger thereon;
    a drying unit with a fluid inlet in communication with a discharge outlet of the circulation compressor,
    a separation unit with a fluid inlet in communication with a fluid outlet of the drying unit,
    an expander disposed between the drying unit and the separation unit, and a heating-medium storage tank in communication with a first heat exchanger inlet of the circulation compressor and with a heating-medium outlet of the drying unit;

wherein a first heat exchanger outlet of the circulation compressor is in communication with a heating-medium inlet of the drying unit.

\* \* \* \* \*